United States Patent
Sun et al.

(10) Patent No.: US 11,316,821 B2
(45) Date of Patent: Apr. 26, 2022

(54) SERVER GROUP AND AIRCRAFT COMMUNICATION METHOD, SERVER AND SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Fuze Sun, Beijing (CN); Xu Li, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 16/767,793

(22) PCT Filed: Sep. 30, 2018

(86) PCT No.: PCT/CN2018/108958
§ 371 (c)(1),
(2) Date: May 28, 2020

(87) PCT Pub. No.: WO2019/105127
PCT Pub. Date: Jun. 6, 2019

(65) Prior Publication Data
US 2020/0344201 A1    Oct. 29, 2020

(30) Foreign Application Priority Data

Nov. 30, 2017   (CN) .......................... 201711234664.4

(51) Int. Cl.
*H04L 15/16* (2006.01)
*H04L 61/4535* (2022.01)
(Continued)

(52) U.S. Cl.
CPC ..... *H04L 61/1535* (2013.01); *H04B 7/18506* (2013.01); *H04L 67/141* (2013.01);
(Continued)

(58) Field of Classification Search
CPC .. H04B 7/18506; H04L 67/143; H04L 67/145
See application file for complete search history.

(56) References Cited

U.S. PATENT DOCUMENTS 7,313,143 B1 * 12/2007 Bruno .................. G08G 5/0013
                                                                        342/36
9,622,277 B1 *  4/2017 Sun ..................... H04B 7/18504
(Continued)

FOREIGN PATENT DOCUMENTS

CN         106160837 A      11/2016
CN         106412046 A       2/2017
(Continued)

OTHER PUBLICATIONS

International Search Report dated Dec. 19, 2018 in PCT/CN2018/108958 filed Sep. 30, 2018, 2 pages.
(Continued)

*Primary Examiner* — Hieu T Hoang
(74) *Attorney, Agent, or Firm* — Oblon, McClelland, Maier & Neustadt, L.L.P.

(57) ABSTRACT

The present disclosure provides a server group of aircrafts and an aircraft communication method, server and system, and relate to the technical field of unmanned aerial vehicle. The server group of aircrafts of the present disclosure includes: a plurality of servers, in which, one or more servers are configured to establish a keep-alive connection with an aircraft according to an online request from the aircraft, and send connection information to a sharing node wherein the online request comprises an identification of the aircraft; and one or more servers are configured to receive a connection
(Continued)

Establishing a keep-alive connection with an aircraft by a server in communication with the aircraft according to an online request from the aircraft, wherein the online request includes an aircraft identification — 201

Sending aircraft online information by the server in communication with the aircraft to a sharing node between servers, so that a server in communication with a ground station determines a connection state of the aircraft and IP address information of the server in communication with the aircraft through the sharing node — 202 establishment request from a ground station, determine connection information of the aircraft corresponding to the identification of the aircraft to which the ground station requests to connect through the sharing node; and establish a connection between the aircraft to which the ground station requests to connect and the ground station according to the connection information.

17 Claims, 5 Drawing Sheets

(51) Int. Cl.
  *H04B 7/185* (2006.01)
  *H04L 67/141* (2022.01)
  *H04L 67/143* (2022.01)
  *H04L 67/145* (2022.01)
  *H04L 67/54* (2022.01)

(52) U.S. Cl.
  CPC .......... *H04L 67/143* (2013.01); *H04L 67/145* (2013.01); *H04L 67/24* (2013.01)

(56) References Cited

U.S. PATENT DOCUMENTS

| | | | | |
|---|---|---|---|---|
| 2002/0147542 | A1* | 10/2002 | Tomescu | G01S 5/0063 701/120 |
| 2005/0232280 | A1* | 10/2005 | Letney | H04L 29/12311 370/400 |
| 2011/0028147 | A1* | 2/2011 | Calderhead, Jr. | H04B 7/18506 455/431 |
| 2011/0116373 | A1* | 5/2011 | Lauer | H01Q 1/007 370/232 |
| 2015/0203212 | A1* | 7/2015 | Zubairi | B64D 45/00 701/14 |
| 2016/0214715 | A1* | 7/2016 | Meffert | B64C 39/024 |
| 2017/0046962 | A1* | 2/2017 | Shipley | G08G 5/0013 |
| 2017/0081026 | A1 | 3/2017 | Winn et al. | |
| 2017/0083979 | A1 | 3/2017 | Winn et al. | |
| 2017/0234966 | A1* | 8/2017 | Naguib | G01S 5/22 367/117 |
| 2020/0287618 | A1* | 9/2020 | Kanemoto | H04W 4/40 |

FOREIGN PATENT DOCUMENTS

| | | | | |
|---|---|---|---|---|
| CN | 106716973 | A | | 5/2017 |
| CN | 106788677 | A | | 5/2017 |
| CN | 106850049 | A | | 6/2017 |
| CN | 106970650 | A | * 7/2017 | ......... H04B 7/18506 |
| CN | 106970650 | A | | 7/2017 |
| CN | 106998270 | A | | 8/2017 |
| CN | 107342784 | A | | 11/2017 |

OTHER PUBLICATIONS

Combined Chinese Office Action and Search Report dated Mar. 4, 2020 in Patent Application No. 201711234664.4.

Combined Chinese Office Action and Search Report dated Nov. 4, 2020 in Chinese Patent Appiication No. 201711234664.4 (with English translation of Category of Cited Documents), 9 pages.

* cited by examiner

SERVER GROUP AND AIRCRAFT COMMUNICATION METHOD, SERVER AND SYSTEM

CROSS-REFERENCE TO RELATED APPLICATIONS

This application is a 371 of International App. No. PCT/CN2018/108958, filed Sep. 30, 2018, which is based on and claims the benefit of priority to the Chinese patent application No. 201711234664.4 filed on Nov. 30, 2017, wherein each of the foregoing applications is hereby incorporated by reference in its entirety into the present application

TECHNICAL FIELD

The present disclosure relates to the technical field of unmanned aerial vehicles, in particular to a server group, and an aircraft communication method, server and system.

BACKGROUND

A ground station is required to monitor and operate aircrafts during the flying of the unmanned aircrafts, and under the scene of large-scale application of unmanned aircrafts, how a large number of aircrafts are remotely connected with the corresponding ground station is an important issue.

There are various kinds of connection modes for the communication between the aircrafts and the ground station, and in the related art, the aircrafts can be connected with the ground station by means of a short-distance connection, or by means of a long-distance connection through base station relay.

SUMMARY

According to an aspect of some embodiments of the present disclosure, there is provided an aircraft server group, comprising: a plurality of servers, in which, one or more servers in communication with an aircraft are configured to: establish a keep-alive connection with an aircraft according to an online request from the aircraft, wherein the online request comprises an aircraft identification; and send connection information to a sharing node; and one or more servers in communication with a ground station are configured to: receive a connection establishment request from the ground station, wherein the connection establishment request comprises an aircraft identification; determine the connection information of an aircraft corresponding to the aircraft identification through the sharing node; and establish a connection between the aircraft and the ground station according to the connection information.

In some embodiments, the connection information comprises an aircraft connection state and IP address information of a server in communication with the aircraft; and establish the connection between the aircraft and the ground station comprises: in a condition that the aircraft is online, establish the connection with the ground station by a server in communication with the ground station; and establish a connection with the server in communication with the aircraft by the server in communication with the ground station according to the IP address information of the server in communication with the aircraft.

In some embodiments, the server in communication with the aircraft is further configured to: when the aircraft is offline, send aircraft offline information to the sharing node, so that the sharing node records that the aircraft is not online.

In some embodiments, the server in communication with the ground station is further configured to: in a condition that the aircraft is not online, delete the connection with the ground station.

According to an aspect of some embodiments of the present disclosure, there is provided an aircraft communication method, comprising: receiving a connection establishment request from a ground station by a server in communication with the ground station, wherein the connection establishment request comprises an aircraft identification; determining connection information of an aircraft corresponding to the aircraft identification by the server in communication with the ground station, through a sharing node between servers, wherein the connection information is uploaded to the sharing node by a server in communication with the aircraft; and establishing a connection with the aircraft by the server in communication with the ground station according to the connection information.

In some embodiments, the connection information comprises an aircraft connection state and IP address information of the server in communication with the aircraft; and establishing the connection with the aircraft by the server in communication with the ground station according to the connection information comprises: in a condition that the aircraft is online, establishing a connection with the ground station by the server in communication with the ground station; and establishing a connection with the server in communication with the aircraft by the server in communication with the ground station, in a condition that an IP address of the server in communication with the aircraft is different from an own IP address of the server in communication with the ground station.

In some embodiments, the aircraft communication method further comprises: in a condition that it is determined that the aircraft corresponding to the aircraft identification is not online, the server in communication with the ground station deletes the connection with the ground station.

According to an aspect of some embodiments of the present disclosure, there is provided an aircraft communication method, comprising: establishing a keep-alive connection with an aircraft by a server in communication with the aircraft according to an online request from the aircraft, wherein the online request comprises an aircraft identification; sending aircraft online information by the server in communication with the aircraft to a sharing node between servers, so that a server in communication with a ground station determines a connection state of the aircraft and IP address information of the server in communication with the aircraft through the sharing node, wherein the aircraft online information comprises the aircraft identification and the IP address information of the server in communication with the aircraft.

In some embodiments, the aircraft communication method further comprises: when the aircraft is offline, sending aircraft offline information to the sharing node by the server in communication with the aircraft, so that the sharing node records that the aircraft is not online.

In some embodiments, the aircraft communication method further comprises: receiving a connection establishment request from the server in communication with the ground station; and establishing a connection with the server that sends the connection establishment request.

According to an aspect of some embodiments of the present disclosure, there is provided an aircraft communication server, comprising: a connection request receiving unit configured to receive a connection establishment request from a ground station, wherein the connection establishment request comprises an aircraft identification; a connection state determining unit configured to determine connection information of an aircraft corresponding to the aircraft identification through a sharing node between servers, wherein the connection information is uploaded to the sharing node by a server in communication with the aircraft; and a ground station connecting unit configured to establish a connection with the aircraft according to the connection information.

In some embodiments, the connection information comprises an aircraft connection state and IP address information of the server connected with the aircraft; the ground station connecting unit comprises: a ground station connecting subunit configured to establish a connection with the ground station in a condition that the aircraft is online; and a server connecting subunit configured to establish a connection with the server in communication with the aircraft, in a condition that an IP address of the server in communication with the aircraft is different from an own IP address of the server in communication with the ground station.

In some embodiments, the ground station connecting unit is further configured to delete the connection with the ground station in the event that it is determined that the aircraft corresponding to the aircraft identification is not online.

According to an aspect of some embodiments of the present disclosure, there is provided an aircraft communication server, comprising: an aircraft connecting unit configured to establish a keep-alive connection with an aircraft according to an online request from the aircraft, wherein the online request comprises an aircraft identification; an information synchronizing unit configured to send aircraft online information to a sharing node between servers, so that a server in communication with a ground station determines a connection state of the aircraft and IP address information of a server in communication with the aircraft through the sharing node, wherein the aircraft online information comprises the aircraft identification and the IP address information of the server in communication with the aircraft.

In some embodiments, the information synchronizing unit is further configured to send aircraft offline information to the sharing node when the aircraft is offline, so that the sharing node records that the aircraft is not online.

In some embodiments, the aircraft communication server further comprises: an inter-server connection establishing unit configured to establish a connection with the server in communication with the ground station according to a connection establishment request from the server in communication with the ground station.

According to an aspect of some embodiments of the present disclosure, there is provided an aircraft communication server, comprising: a functional unit of any server in communication with the ground station in the foregoing; and, a functional unit of any server in communication with the aircraft in the foregoing.

Such a server can establish a keep-alive connection with the aircraft and store the connection information of the aircraft in the sharing node when the aircraft requests to establish the connection; when the ground station requests to be connected with the aircraft, the connection information uploaded by the ground station or other servers in communication with the aircraft can be obtained from the sharing node, thereby realizing the bearing of the communication between multiple aircrafts and ground stations, and improving the connection establishment efficiency.

According to an aspect of some embodiments of the present disclosure, there is provided an aircraft communication server, comprising: a memory; and a processor coupled to the memory, the processor configured to perform any of the above-mentioned aircraft communication methods performed by the server in communication with the ground station and/or to perform any of the above-mentioned aircraft communication methods performed by the server in communication with the aircraft, based on instructions stored in the memory.

According to an aspect of some embodiments of the present disclosure, a computer-readable storage medium is provided, on which computer program instructions are stored, which, when executed by a processor, perform the steps of any of the above-mentioned aircraft communication methods performed by the server in communication with the ground station, and/or the steps of any of the above-mentioned aircraft communication methods performed by the server in communication with the aircraft.

According to an aspect of some embodiments of the present disclosure, there is provided an aircraft communication system, comprising: one or more aircrafts, configured to send an aircraft connection establishment request to any aircraft communication server and maintain a keep-alive connection with the server; one or more ground stations, configured to send a connection establishment request to any aircraft communication server and establish a connection with the server; any of the server group mentioned above; and a sharing node configured to store connection state information of the one or more aircrafts and IP address information of the server connected with the one or more aircrafts.

BRIEF DESCRIPTION OF THE DRAWINGS

The accompanying drawings, which are incorporated in and constitute a part of this disclosure, provide a further understanding of the disclosure. The illustrative embodiments of the present disclosure together with the description thereof serve to explain the present disclosure but do not constitute inappropriate definitions to the present disclosure. In the drawings.

DETAILED DESCRIPTION

The technical solution of the present disclosure will be described in further detail below by way of the accompanying drawings and the embodiments.

Figure 1:
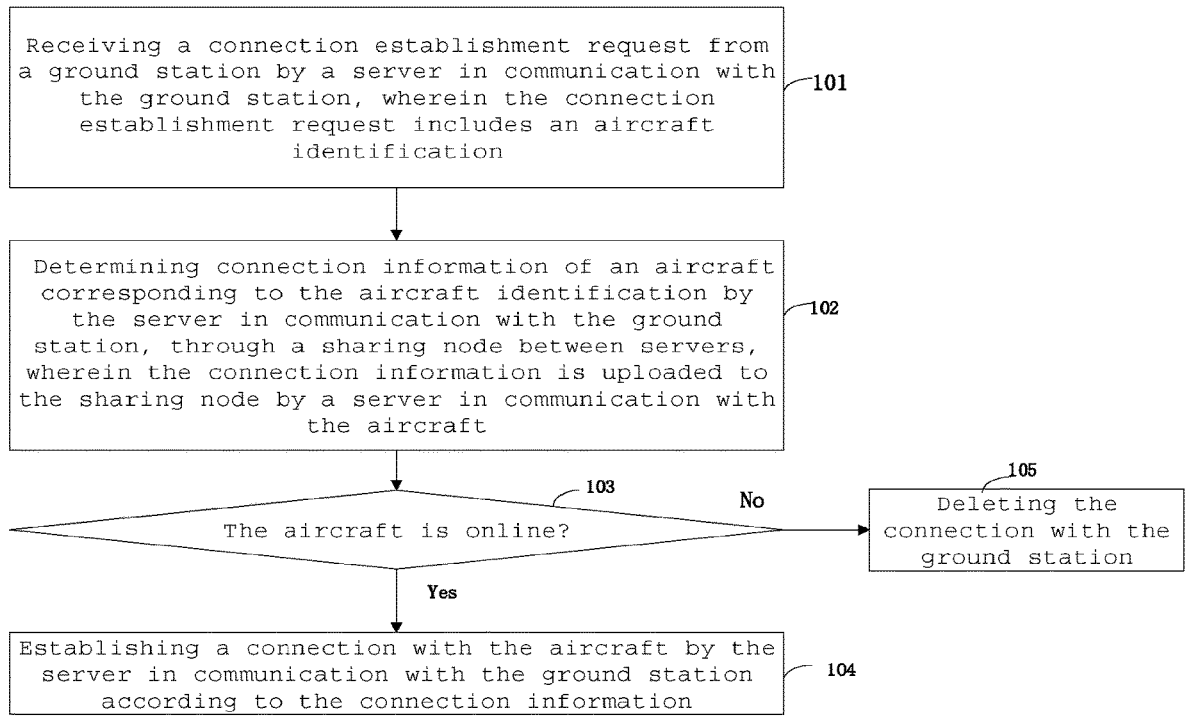
FIG. 1 is a flow chart illustrating some embodiments of an aircraft communication method of the present disclosure.

FIG. 1 is a flow chart illustrating some embodiments of an aircraft communication method of the present disclosure.

In step 101, a server in communication with a ground station receives a connection establishment request from the ground station, the connection establishment request including an aircraft identification. In some embodiments, the aircraft identification may be a communication code specific to the aircraft.

In step 102, the server in communication with the ground station determines connection information of an aircraft corresponding to the aircraft identification through a sharing node between servers. In some embodiments, when the aircraft comes online, a server in communication with the aircraft will upload connection information to the sharing node between servers so that other servers can acquire a connection state of the aircraft.

In step 103, the sharing node determines whether the aircraft corresponding to the aircraft identification is in an online state. In some embodiments, if the sharing node determines that the aircraft is in an online state through aircraft identification matching, the aircraft connection information may be fed back to the server in communication with the ground station that initiates a query; and if the sharing node determines that the aircraft is not on line, it may not feedback any information or feedback an aircraft no connection information.

If the server in communication with the ground station receives the aircraft connection information from the sharing node, and determines that the aircraft is online, step 104 will be performed; in some embodiments, if the server in communication with the ground station does not receive the connection information of the aircraft within a predetermined time, or receives the aircraft no connection information, step 105 will be performed.

In step 104, the server in communication with the ground station establishes a connection with the aircraft based on the connection information. In some embodiments, if the aircraft and the ground station are connected to a same server, the aircraft and the ground station may communicate with each other through the server; if the aircraft and the ground station are not connected to the same server, communication is performed through a communication link between the servers; in some embodiments, the server to which the aircraft is connected can be searched for by broadcasting messages among the servers.

In step 105, the server in communication with the ground station deletes the connection with the ground station.

In this way, the connection information provided by the server in communication with the aircraft can be obtained from the sharing node when the ground station requests to be connected with the aircraft, so that the ground station and the unmanned aircraft can be connected through servers, without the need of a separate link for the ground station and the aircraft, thereby improving the connection establishment efficiency.

Figure 2:
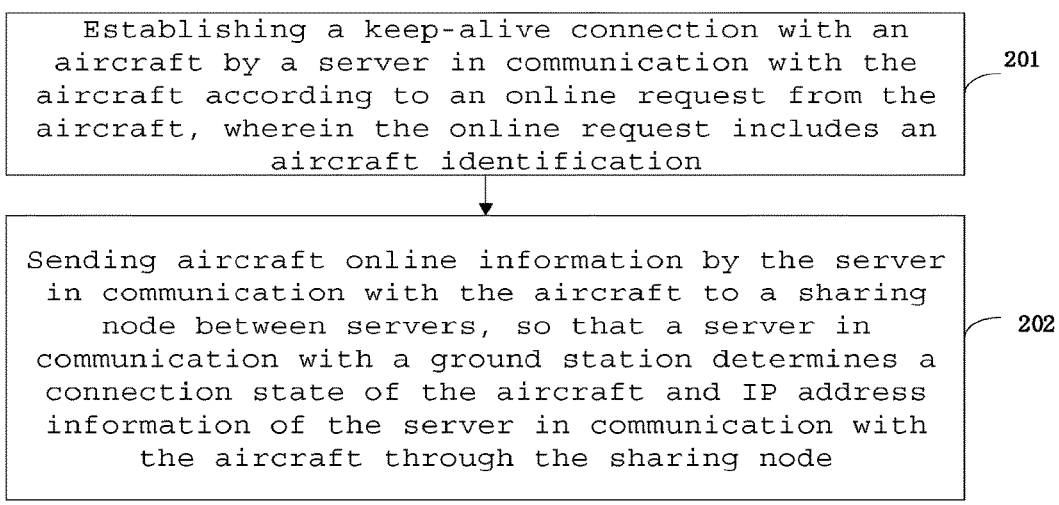
FIG. 2 is a flow chart illustrating further embodiments of the aircraft communication method of the present disclosure.

FIG. 2 is a flowchart illustrating further embodiments of the aircraft communication method of the present disclosure.

In step 201, a server in communication with an aircraft establishes a keep-alive connection with the aircraft according to an online request from the aircraft, wherein the online request includes an aircraft identification.

In step 202, the server in communication with the aircraft sends aircraft online information to a sharing node between servers, so that the server in communication with the ground station determines a connection state of the aircraft through the sharing node. In some embodiments, the sharing node may also determine IP address information of the server in communication with the aircraft from a source address of the online information of the aircraft.

In this way, the server in communication with the unmanned aircraft can establish a keep-alive connection with the aircraft and store the connection information of the aircraft in the sharing node, so that the connection information can be obtained from the sharing node when the ground station requests to be connected with the aircraft, and the ground station and the aircraft can be connected through servers, thereby improving the connection establishment efficiency.

In some embodiments, when the aircraft is offline, a server in communication with the aircraft will send aircraft offline information to the sharing node, so that the sharing node records that the aircraft is not online.

In some embodiments, after the server in communication with the ground station determines that the server in communication with the aircraft is not itself, a connection establishment request may be sent to the server in communication with the aircraft to establish a connection between the two servers, thereby enabling the ground station to communicate with the aircraft in the condition that the server to which the aircraft is connected and the server to which the ground station is connected are different.

Figure 3:
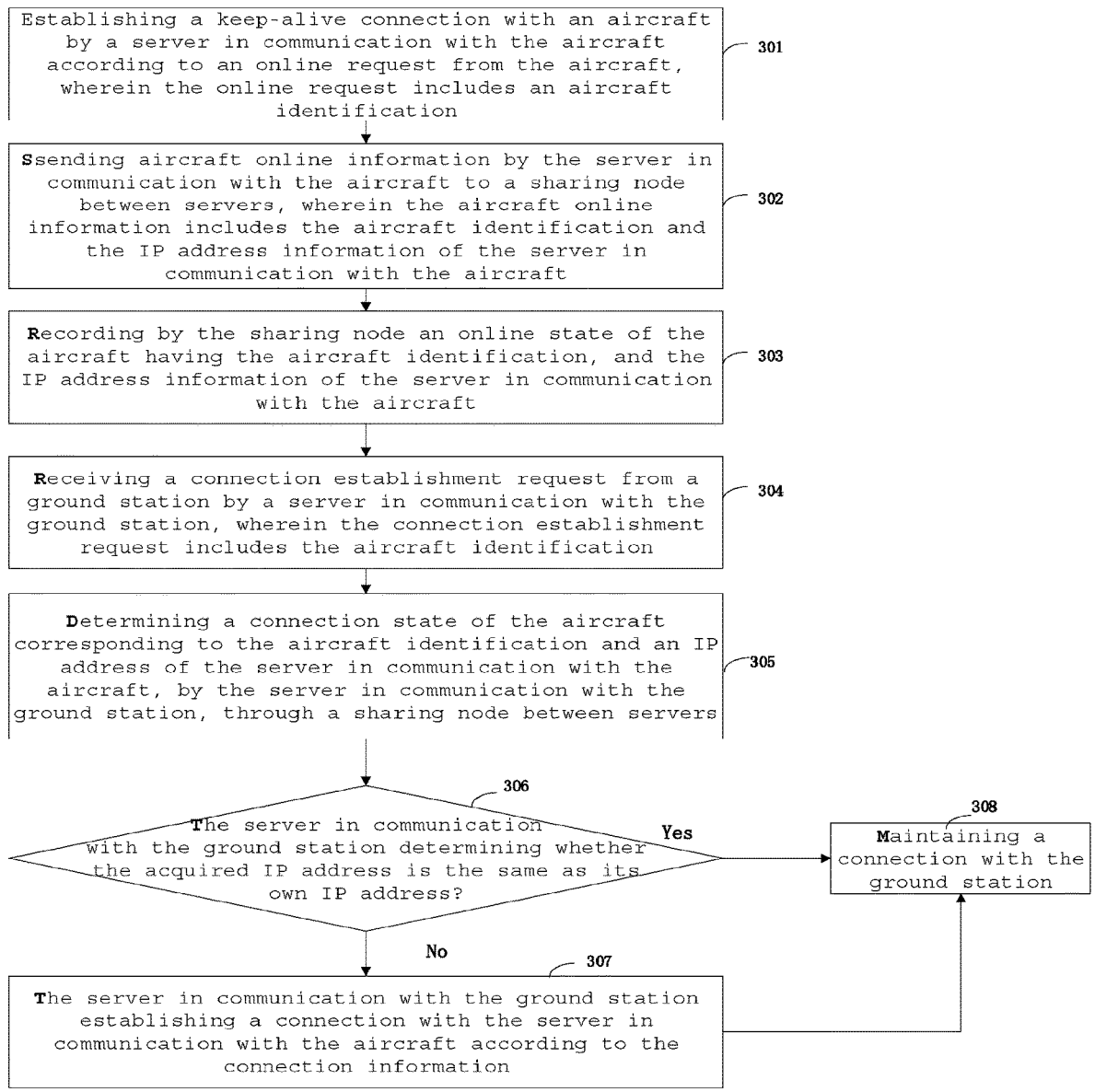
FIG. 3 is a flow chart illustrating still further embodiments of the aircraft communication method of the present disclosure.

FIG. 3 is a flow chart illustrating still further embodiments of the aircraft communication method of the present disclosure.

In step 301, a server in communication with an aircraft establishes a keep-alive connection with the aircraft according to an online request from the aircraft.

In step 302, the server in communication with the aircraft sends aircraft online information to a sharing node between servers, so that a server in communication with a ground station determines a connection state of the aircraft and IP address information of the server in communication with the aircraft through the sharing node, wherein the aircraft online information includes an aircraft identification and the IP address information of the server in communication with the aircraft.

In step 303, the sharing node records the online state of the aircraft corresponding to the aircraft identification, and the IP address information of the server in communication with the aircraft or the aircraft identification. In some embodiments, the sharing node may be a system such as Zookeeper or Redis.

In step 304, the server in communication with the ground station receives a connection establishment request from the ground station, the connection establishment request including the aircraft identification.

In step 305, the server in communication with the ground station determines connection information of the aircraft corresponding to the aircraft identification through the sharing node between servers, wherein the connection information includes the connection state and the IP address information of the server in communication with the aircraft.

In step 306, the server in communication with the ground station determines whether the acquired IP address is the same as its own IP address, and if the two are different, step 307 is performed; if the two are the same, step 308 is performed.

In step 307, the server in communication with the ground station sends the connection establishment request to the server corresponding to the acquired IP address, and the server receiving the connection establishment request establishes a connection with the server in communication with the ground station.

In step 308, the server in communication with the ground station maintains a connection with the ground station.

In this way, a keep-alive connection can be established with the aircraft by a server when the aircraft requests to establish a connection, and the connection state of the aircraft can be stored in the sharing node; when the ground station requests to be connected with the aircraft, the connection state uploaded by the server in communication with the ground station or other servers in communication with the aircraft can be obtained from the sharing node, thereby realizing the bearing of the communication between multiple aircrafts and ground stations, and improving the connection establishment efficiency; in addition, since the sharing node also stores the IP address information of the server connected with the aircraft in an online state, the aircraft in communication with the ground station can conveniently determine server to be connected to, thereby the connection can be established quickly, and further the efficiency of connection establishment and communication is improved.

Figure 4:
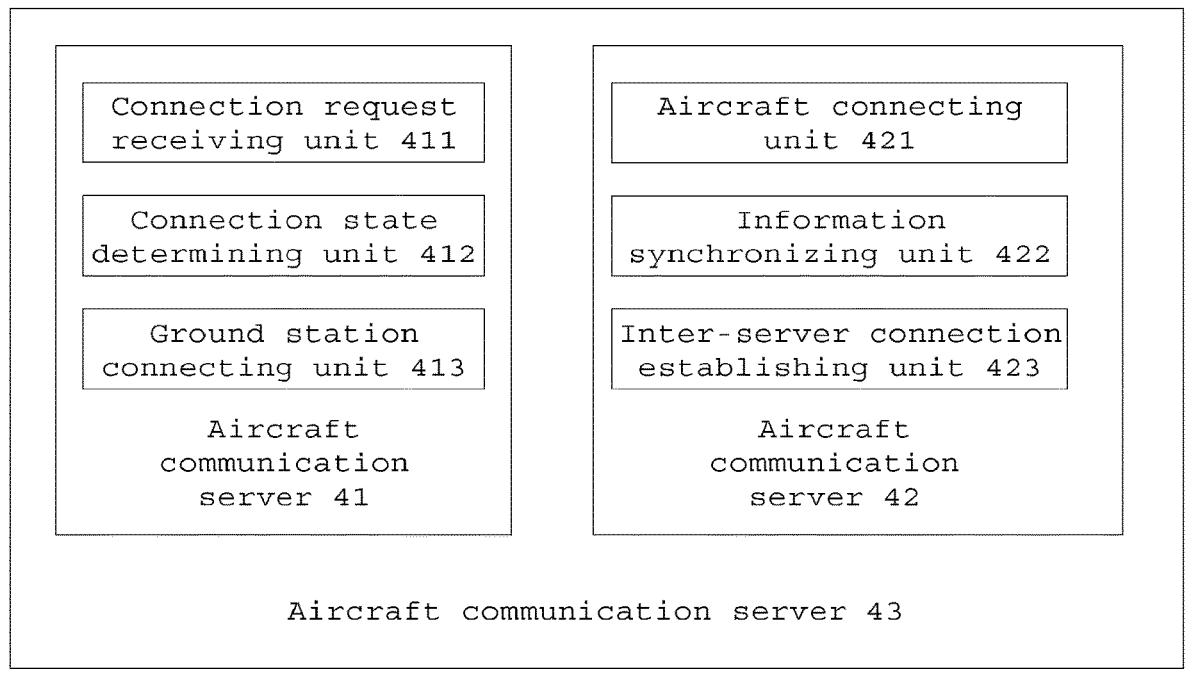
FIG. 4 is a schematic diagram illustrating some embodiments of an aircraft communications server of the present disclosure.

Some embodiments, the aircraft communication server of the present disclosure is as the aircraft communication server 41 shown in FIG. 4, may be a server in communication with a ground station. A connection request receiving unit 411 can receive a connection establishment request from the ground station, the connection establishment request including an aircraft identification. In some embodiments, the aircraft identification may be a communication code specific to the aircraft. A connection state determining unit 412 can determine connection information of an aircraft corresponding to the aircraft identification through a sharing node between servers. In some embodiments, when the aircraft comes online, a server in communication with the aircraft will upload the connection information to the sharing node between servers, so that other servers acquire the connection state of the aircraft. A ground station connecting unit 413 can establish a connection with the aircraft based on the connection information in the event that the aircraft connection information from the sharing node is received and the aircraft is determined to be online. In some embodiments, if the aircraft and the ground station are connected to the same server, the aircraft and the ground station may communicate through the server; if the aircraft and the ground station are not connected to the same server, communication is performed through a communication link between the servers; in some embodiments, the server to which the aircraft is connected can be searched for by broadcasting messages among the servers.

Such a server can obtain the connection information provided by the server connected with the aircraft from the sharing node when the ground station requests to be connected with the aircraft, so that the connection between the ground station and the aircraft is realized through servers, without the need of a separate link for the ground station and the aircraft, thereby improving the connection establishment efficiency.

In some embodiments, the connection information includes, in addition to the connection state information of the aircraft, IP address information of the server connected with the aircraft. The ground station connecting unit 413 includes a ground station connecting subunit capable of establishing a connection with the ground station in the event that the aircraft is online, and a server connecting subunit capable of establishing a connection with the server connected with the aircraft according to the IP address information of the server connected with the aircraft.

Such a server can quickly determine the server connected with the aircraft, thereby quickly establishing a connection between the servers, and further improving the connection establishment and communication efficiency.

In some embodiments, the ground station connecting unit 413 can also delete the connection with the ground station when it is determined that the aircraft corresponding to the aircraft identification is not online, so as to reduce occupation of connection channels and facilitate ground station operators to learn the state of the aircraft as soon as possible.

Some embodiments, the aircraft communication server of the present disclosure is as the aircraft communication server 42 shown in FIG. 4, may be a server in communication with an aircraft. The aircraft connecting unit 421 can establish a keep-alive connection with the aircraft according to an online request from the aircraft, wherein the online request includes an aircraft identification. An information synchronizing unit 422 can send aircraft online information to a sharing node between servers so that the server in communication with the ground station determines a connection state of the aircraft through the sharing node. In some embodiments, the sharing node may also determine IP address information of the server in communication with the aircraft from a source address of the aircraft online information.

Such a server can establish a keep-alive connection with the aircraft and store the connection information of the aircraft in the sharing node, so that the connection information can be obtained from the sharing node when the ground station requests to be connected with the aircraft, thereby realizing the connection between the ground station and the aircraft through the server, and improving the connection establishment efficiency.

In some embodiments, as shown in FIG. 4, the aircraft communication server 42 may further comprise an inter-server connection establishing unit 423, capable of receiving a connection establishment request from the server in communication with the ground station, and establishing a connection between the two servers, thereby enabling the ground station to communicate with the aircraft in the event that the server to which the aircraft is connected and the server to which the ground station is connected are different.

In some embodiments, the information synchronizing unit 422 can also send aircraft offline information to the sharing node when the aircraft is offline, so that the sharing node records that the aircraft is not online, thereby ensuring real-time messaging in the sharing node, avoiding a ground station connection error caused by untimely message update, and improving the reliability of the system.

Some embodiments, the aircraft communication server of the present disclosure is as the aircraft communication server 43 shown in FIG. 4, which comprises the aircraft communications server 41 and the aircraft communications server 42 mentioned above. In some embodiments, the aircraft communications server 43 may have a port for communicating with the aircraft and a port for communicating with the ground station, enabling interactions with the aircraft and the ground station, respectively; the system can also comprise an uplink interaction port for enabling information interaction with the sharing node; and one or more communication ports between servers, for enabling interaction between the servers through a Transmission Control Protocol (TCP).

Such a server can establish a keep-alive connection with the aircraft when the aircraft requests to establish the connection and store the connection information of the aircraft in the sharing node; when the ground station requests to be connected with the aircraft, the connection information uploaded by the server itself or other servers in communication with the aircraft can be obtained from the sharing node, thereby realizing the bearing of the communication between multiple aircrafts and ground stations and improving the connection establishment efficiency. The aircraft and the ground station can randomly select the accessed server, or arbitrarily select the accessed server according to the conditions such as geographic position, server load and the like, for mutual communication, thereby improving the flexibility of connection between the aircraft and the ground station and the server.

Figure 5:
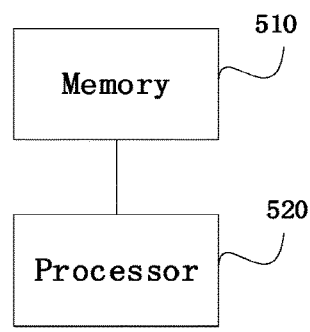
FIG. 5 is a schematic diagram illustrating further embodiments of the aircraft communications server of the present disclosure.

FIG. 5 is a schematic diagram illustrating a structure of some embodiments of the aircraft communication server of the present disclosure. The aircraft communications server comprises a memory 510 and a processor 520. The memory 510 may be a magnetic disk, a flash memory, or any other non-volatile storage medium. The memory is used to store instructions executed by the server in communication with the ground station or the server in communication with the aircraft, or instructions executed by the server in communication with the ground station and the server in communication with the aircraft, in the corresponding embodiments of the aircraft communication method above. The processor 520 is coupled to the memory 510, and may be implemented as one or more integrated circuits, such as a microprocessor or microcontroller. The processor 520 is configured to execute the instructions stored in the memory, so as to realize the bearing of the communication between multiple aircrafts and ground stations, and thus improve the connection establishment efficiency between the aircrafts and ground stations.

Figure 6:
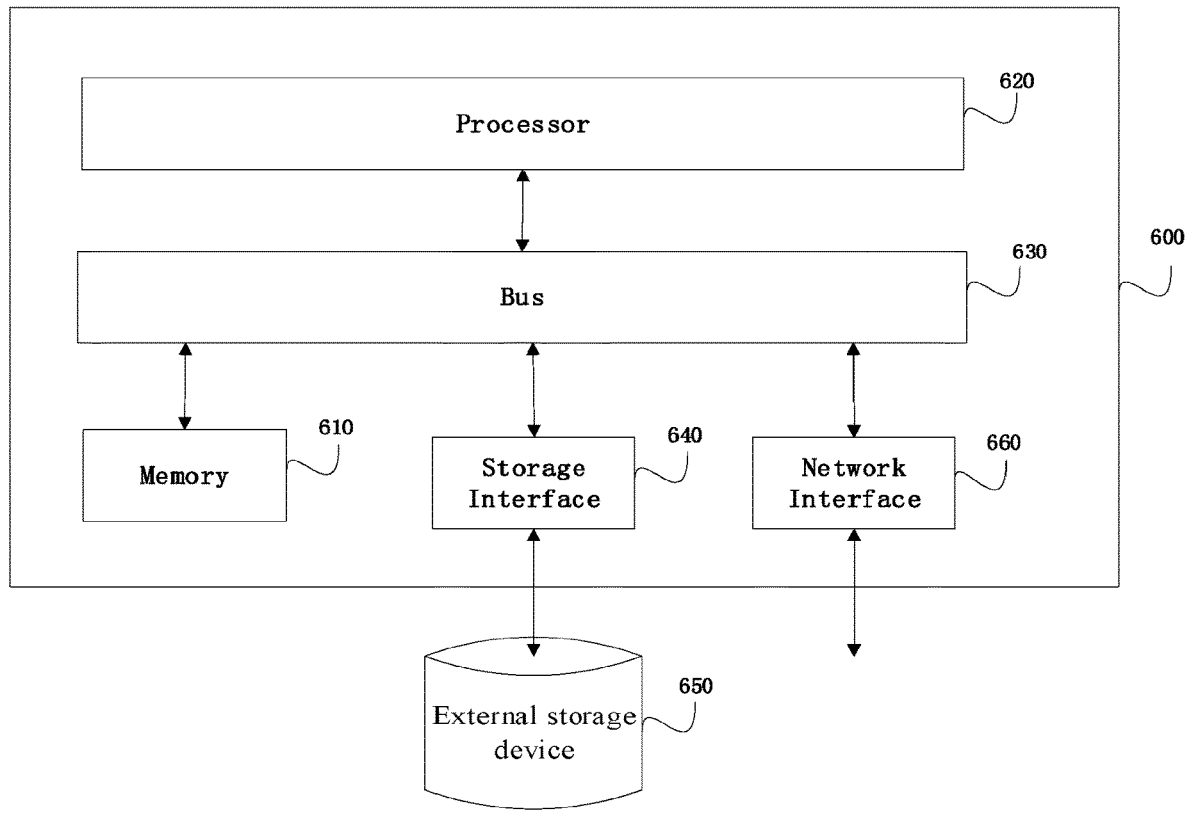
FIG. 6 is a schematic diagram illustrating still further embodiments of the aircraft communication server of the present disclosure.

In some embodiments, as also shown in FIG. 6, the aircraft communication server 600 comprises a memory 610 and a processor 620. The processor 620 is coupled to the memory 610 through a BUS 630. The aircraft communication server 600 may also be connected to an external storage device 650 via a storage interface 640 for the purpose of retrieving external data, and may also be connected to a network or another computer system (not shown) via a network interface 660. A detailed signaling flow diagram is not described in detail herein.

In the embodiment, by storing the data instructions in the memory and processing the instructions by the processor, the bearing of the communication between multiple aircrafts and ground stations can be realized, thereby improving the connection establishment efficiency.

In still other embodiments, a computer-readable storage medium is provided, having stored thereon computer program instructions which, when executed by a processor, implement the steps of a method performed by the server in communication with the ground station or the server in communication with the aircraft, or a method performed by the server in communication with the ground station and the server in communication with the aircraft, in corresponding embodiments of the aircraft communication method. As will be appreciated by one of skill in the art, embodiments of the present disclosure may be provided as a method, apparatus, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-available non-transitory storage media (including, but not limited to, disk storage, CD-ROM, optical storage, and so forth) having computer-available program code embodied therein.

Figure 7:
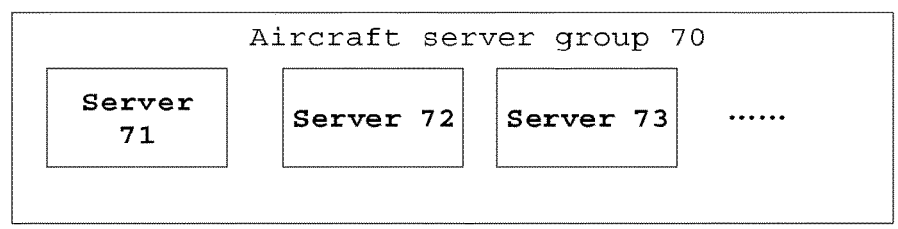
FIG. 7 is a schematic diagram illustrating some embodiments of an aircraft communication server group of the present disclosure.

FIG. 7 is a schematic diagram illustrating some embodiments of an aircraft communication server group of the present disclosure. An aircraft server group 70 includes one or more servers, such as servers 71, 72, 73, and the aircraft server group 70 includes one or more servers in communication with the aircraft, capable of establishing a keep-alive connection with the aircraft according to an online request from the aircraft and sending connection information to a sharing node. In some embodiments, the servers in communication with the aircraft may be any of the above-mentioned servers in communication with the aircraft. The aircraft server group 70 further includes one or more servers in communication with the ground station, capable of receiving a connection establishment request from the ground station, determining connection information of the aircraft corresponding to the aircraft identification through the sharing node, and establishing a connection between the aircraft and the ground station according to the connection information. In some embodiments, the servers in communication with the ground station may be any of the above-mentioned servers in communication with the ground station.

Such an aircraft server group can establish a keep-alive connection with the aircraft and store the connection information of the aircraft to the sharing node, and when the ground station requests connection with the aircraft, the server can obtain the connection information from the sharing node, thereby realizing the connection of the ground station with the aircraft through servers and improving the connection establishment efficiency.

In some embodiments, the servers 71, 72, 73 can simultaneously serve as a server in communication with the aircraft and a server in communication with the ground station, enabling cross-server communication between the aircraft and the ground station. The aircraft and the ground station can randomly select the accessed server, or arbitrarily select the accessed server according to the conditions such as geographic position, server load and the like, for mutual communication, so as to improve the flexibility.

Figure 8:
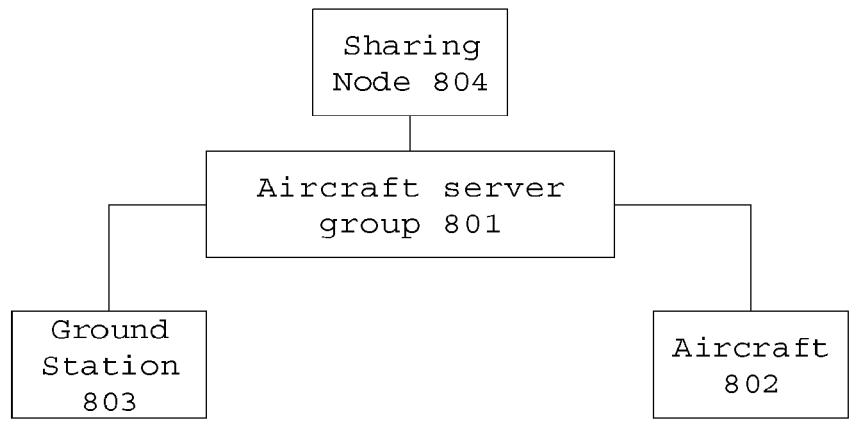
FIG. 8 is a schematic diagram illustrating some embodiments of an aircraft communication system of the present disclosure.

FIG. 8 is a schematic diagram illustrating some embodiments of an aircraft communication system of the present disclosure. An aircraft server group 801 may be any of the aircraft server group 801 mentioned above, including one or more servers. An aircraft 802 can establish a connection with a server in the aircraft server group 801, and the server uploads aircraft connection information to a sharing node 804; a ground station 803 can also establish connection with a server in the aircraft server group 801, obtain the aircraft connection information from the sharing node 804, and realize interactions between the aircraft and the ground station through communication links between the aircraft and the server, between the servers, and between the server and the ground station, thereby eliminating the need to separately open up a link for the ground station and the aircraft, improving the bearing capacity of the communication between the aircraft and the ground station, and improving the connection establishment efficiency.

Figure 9:
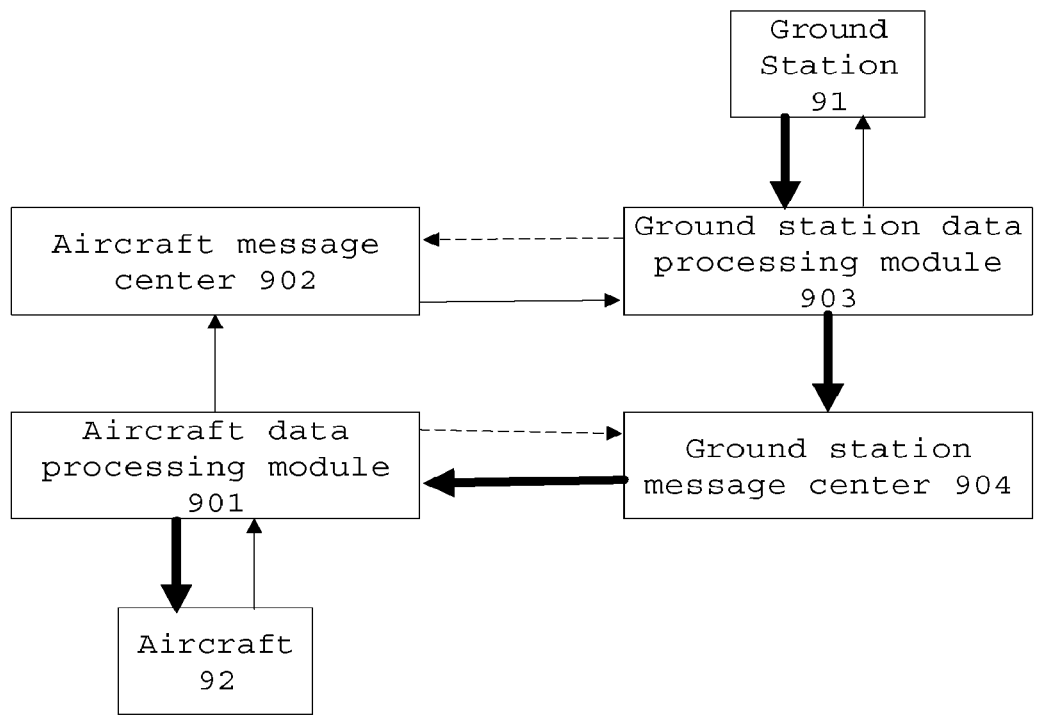
FIG. 9 is a schematic diagram illustrating further embodiments of the aircraft communication system of the present disclosure.

FIG. 9 is a schematic diagram illustrating further embodiments of an aircraft communication system of the present disclosure.

An aircraft data processing module 901 is a module for processing aircraft data on the aircraft communication server and is responsible for processing messages sent by the aircraft and pushing messages to the aircraft. A connection of each aircraft 91 will create an aircraft data processing module respectively, i.e., the aircraft connection corresponds to an aircraft data processing module 901, at one-to-one basis, and it parses its unique communication code from the aircraft data packet and binds with the aircraft data processing module itself.

After receiving the data from the aircraft, the aircraft data processing module 901 passes the data to an aircraft message center 902.

The aircraft message center 902 and the ground station data processing module 903 are in a mode of a pair of observers, wherein the ground station data processing module 903 is an observer, and the aircraft message center 902 is observed in a singleton mode. The aircraft message center 902 will notify all observers of the transmitted data as the data packet of the observed. A ground station message center 904, like the aircraft message center 902, functions to forward data.

The ground station data processing module 903 is a module for processing and transmitting ground station data on the aircraft server, and thus solves the clustering problem. A connection of each ground station will create a ground station data processing module 903, respectively, i.e. the ground station data processing module 903 corresponds to and binds to the ground station one to one.

The ground station data processing module 903 will analyze whether the data from the aircraft message center 902 is the data required by the corresponding ground station according to the communication code, send only the data required by the corresponding ground station to the ground station, and transmit the message received from the ground station to the ground station message center 904.

A path of the data sent by the aircraft to the ground station can be shown by thin solid lines in FIG. 9, and a path of the data sent by the ground station to the aircraft can be shown by thick solid lines in FIG. 9. Take an aircraft sending a message to a ground station as an example.

The data packet is transmitted to the aircraft data processing module 901 through a TCP channel, and the communication code of the aircraft is parsed. The message is passed into the aircraft message center 902 and notifies all ground station data processing modules 903.

The ground station data processing module 903 receives the message and judges whether the message matches with the communication code of the bound ground station, and if match, the communication is completed, thereby guaranteeing data isolation, that is, only paired ground stations and aircrafts can receive and transmit data mutually.

Such an aircraft communication system changes the condition that a connection of each aircraft with one ground station needs to deploy one transmission service independently, and thus meets the requirements of connections between multiple pairs of aircrafts and ground stations.

The present disclosure is described with reference to flowcharts and/or block diagrams of methods, devices (systems) and computer program products according to the embodiments of the present disclosure. It will be understood that each flow and/or block in the flowchart and/or block diagram, and combinations of flows and/or blocks in the flowchart and/or block diagram, can be implemented by computer program instructions. These computer program instructions may be provided to a processor of a general purpose computer, special purpose computer, embedded processor, or other programmable data processing apparatus to produce a machine, such that the instructions, when executed by the processor of the computer or other programmable data processing apparatuses, generate means for implementing the functions specified in one or more flows of the flowchart and/or one or more blocks in the block diagram.

These computer program instructions may also be stored in a computer-readable memory that can direct a computer or other programmable data processing apparatuses to function in a particular manner, such that the instructions stored in the computer-readable memory produce an article of manufacture including instruction means which implement the functions specified in one or more flows of the flowchart and/or one or more blocks in the block diagram.

These computer program instructions may also be loaded onto a computer or other programmable data processing apparatuses to cause a series of operational steps to be performed on the computer or other programmable apparatuses to produce a computer implemented process such that the instructions, when executed on the computer or other programmable apparatuses, provide steps for implementing the functions specified in one or more flows of the flowchart and/or one or more blocks in the block diagram.

Thus far, the present disclosure has been described in detail. Some details well known in the art have not been described in order to avoid obscuring the concepts of the present disclosure. Those skilled in the art can now fully appreciate how to implement the teachings disclosed herein, in view of the foregoing description.

The methods and device of the present disclosure may be implemented in a number of ways. For example, the method and device of the present disclosure may be implemented by software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be embodied as programs recorded in a recording medium, the programs including machine-readable instructions for implementing the method according to the present disclosure. Thus, the present disclosure also covers a recording medium storing a program for executing the method according to the present disclosure.

Finally, it should be noted that: the above examples are intended only to illustrate the technical solutions of the present disclosure and not to limit it; although the present disclosure has been described in detail with reference to preferred embodiments, those of ordinary skill in the art will understand that: modifications to the specific embodiments of the disclosure or equivalent substitutions for parts of the technical features may be made without departing from the spirit of the technical solutions of the present application, and all of these are intended to be covered by the scope of the technical solutions as claimed in this disclosure.

What is claimed is:
1. A server group, comprising:
a plurality of servers, in which,
a first group of the servers are configured to:
establish a keep-alive connection with an aircraft according to an online request from the aircraft, and send connection information of the aircraft to a sharing node, wherein the online request comprises an identification of the aircraft which sent the online request; and a second group of the servers are configured to:
receive a connection establishment request from a ground station, the connection establishment request comprising an identification of an aircraft to which the ground station requests to connect,
determine the connection information of the aircraft to which the ground station requests to connect corresponding to the identification of the aircraft to which the ground station requests to connect, through the sharing node, and
establish a connection between the aircraft to which the ground station requests to connect and the ground station according to the connection information.

2. The server group according to claim 1, wherein the connection information comprises a connection state of the aircraft and IP address information of a server of the first group of the servers which is in the keep-alive connection with the aircraft; and
said establish the connection between the aircraft to which the ground station requests to connect and the ground station includes:
in a condition that the aircraft is online, keep the connection with the ground station by a server of the second group of the servers; and
establish a connection with the server of the first group of the servers which is in the keep-alive connection with the aircraft to which the ground station requests to connect according to the IP address information.

3. The server group according to claim 1, wherein a server of the first group of the servers which is in the keep-alive connection with an aircraft is further configured to:
when the aircraft is offline, send offline information of the aircraft which is offline to the sharing node, so that the sharing node records that the aircraft which is offline is not online.

4. The server group according to claim 1, wherein a server of the second group of the servers which is in communication with the ground station is further configured to:
in a condition that the aircraft to which the ground station requests to connect is not online, delete the connection with the ground station.

5. An aircraft communication method, comprising:
receiving a connection establishment request from a ground station by a server in communication with the ground station, wherein the connection establishment request comprises an identification of an aircraft to which the ground station requests to connect;
determining connection information of the aircraft to which the ground station requests to connect corresponding to the identification of the aircraft by the server in communication with the ground station, through a sharing node between servers, wherein the connection information is uploaded to the sharing node by a server in communication with the aircraft; and
establishing a connection with the aircraft by the server in communication with the ground station according to the connection information.

6. The aircraft communication method according to claim 5, wherein the connection information comprises a connection state of the aircraft and IP address information of the server in communication with the aircraft; and
said establishing the connection with the aircraft by the server in communication with the ground station according to the connection information includes:

in a condition that the aircraft is online, keeping the connection with the ground station by the server in communication with the ground station; and
establishing a connection with the server in communication with the aircraft by the server in communication with the ground station, in a condition that an IP address of the server in communication with the aircraft is different from an own IP address of the server in communication with the ground station.

7. The aircraft communication method according to claim 5, further comprising:
in a condition that it is determined that the aircraft corresponding to the identification is not online, the server in communication with the ground station deletes the connection with the ground station.

8. An aircraft communication method, comprising:
establishing a keep-alive connection with an aircraft by a server in communication with the aircraft according to an online request from the aircraft, wherein the online request comprises an identification of the aircraft; and
sending connection information of the aircraft by the server in communication with the aircraft to a sharing node between servers, so that a server in communication with a ground station determines a connection state of the aircraft and IP address information of the server in communication with the aircraft through the sharing node, wherein the connection information comprises the identification of the aircraft and the IP address information of the server in communication with the aircraft.

9. The aircraft communication method according to claim 8, further comprising:
when the aircraft is offline, sending aircraft offline information to the sharing node by the server in communication with the aircraft, so that the sharing node records that the aircraft is not online.

10. The aircraft communication method according to claim 8, further comprising:
receiving a connection establishment request from the server in communication with the ground station; and
establishing a connection with the server in communication with the aircraft that sends the connection establishment request.

11. An aircraft communication server, comprising:
a memory; and
a processor coupled to the memory,
wherein the processor is configured to perform the method of claim 5, based on instructions stored in the memory.

12. A non-transitory computer-readable storage medium having stored thereon computer program instructions that, when executed by a processor, implement the method according to claim 5.

13. An aircraft communication system, comprising:
the server group according to claim 1;
one or more aircrafts, configured to send the online request to a server of the first group of the servers and maintain the keep-alive connection with the server of the first group of the servers which received the online request;
one or more ground stations, configured to send the connection establishment request to a server of the second group of the servers and establish a connection with the server of the second group of the servers which received the connection establishment request; and
a sharing node configured to store connection state information of the one or more aircrafts and IP address information of the server of the first group of the servers connected with the one or more aircrafts.

14. An aircraft communication server, comprising:
a memory; and
a processor coupled to the memory, wherein the processor is configured to perform the method of claim 8, based on instructions stored in the memory.

15. An aircraft communication server, comprising:
a memory; and
a processor coupled to the memory, wherein the processor is configured to, based on instructions stored in the memory, perform the method of claim 5, and a method comprising:
establishing a keep-alive connection with the aircraft by the server in communication with the aircraft according to an online request from the aircraft, wherein the online request comprises an identification of the aircraft; and
sending connection information of the aircraft by the server in communication with the aircraft to the sharing node between servers, so that the server in communication with the ground station determines a connection state of the aircraft and IP address information of the server in communication with the aircraft through the sharing node, wherein the connection information comprises the identification of the aircraft and the IP address information of the server in communication with the aircraft.

16. A non-transitory computer-readable storage medium having stored thereon computer program instructions that, when executed by a processor, implement the method according to claim 8.

17. A non-transitory computer-readable storage medium having stored thereon computer program instructions that, when executed by a processor, implement the method according to claim 5, and a method comprising:
establishing a keep-alive connection with the aircraft by the server in communication with the aircraft according to an online request from the aircraft, wherein the online request comprises an identification of the aircraft; and
sending connection information of the aircraft by the server in communication with the aircraft to the sharing node between servers, so that the server in communication with the ground station determines a connection state of the aircraft and IP address information of the server in communication with the aircraft through the sharing node, wherein the connection information comprises the identification of the aircraft and the IP address information of the server in communication with the aircraft.

* * * * *